United States Patent
Kim et al.

(10) Patent No.: US 7,626,177 B2
(45) Date of Patent: Dec. 1, 2009

(54) METHOD FOR DETECTING X-RAYS AND X-RAY DETECTOR PERFORMING THE METHOD

(75) Inventors: Dong-Cheol Kim, Suwon-si (KR); Dae-Ho Choo, Yongin-si (KR); Sang-Wook Ahn, Seongnam-si (KR); Yeon-Hee Yu, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 12/137,644

(22) Filed: Jun. 12, 2008

(65) Prior Publication Data

US 2009/0152472 A1    Jun. 18, 2009

(30) Foreign Application Priority Data

Dec. 17, 2007    (KR) .................... 10-2007-0131972

(51) Int. Cl.
*G01T 1/24*    (2006.01)
(52) U.S. Cl. ................................. 250/370.15
(58) Field of Classification Search ............. 250/370.15
See application file for complete search history.

(56) References Cited

U.S. PATENT DOCUMENTS

| | | | |
|---|---|---|---|
| 6,411,672 B1 * | 6/2002 | Sasaki et al. ............ | 378/19 |
| 6,713,769 B2 * | 3/2004 | Vafi et al. ............ | 250/370.15 |
| 7,104,687 B2 * | 9/2006 | Okamura et al. ........ | 378/200 |
| 2005/0086948 A1 | 4/2005 | Milke-Rojo et al. | |
| 2006/0076500 A1 * | 4/2006 | Watanabe ............ | 250/370.15 |

FOREIGN PATENT DOCUMENTS

| | | |
|---|---|---|
| JP | 11271456 | 10/1999 |
| JP | 200199942 | 4/2001 |
| JP | 2003107163 | 4/2003 |

* cited by examiner

*Primary Examiner*—Constantine Hannaher
(74) *Attorney, Agent, or Firm*—Cantor Colburn LLP

(57) ABSTRACT

A method for detecting X-rays using an X-ray detector including an X-ray detecting part includes disposing a heat-circulating part adjacent to the X-ray detecting part. The X-ray detecting part includes light-detecting diodes. The method further includes detecting ambient temperatures of the light detecting diodes, circulating heat in the heat-circulating part based upon a result of the detecting the ambient temperatures of the light detecting diodes, increasing a uniformity of the ambient temperatures of the light-detecting diodes, and detecting X-rays irradiated into the X-ray detector.

20 Claims, 10 Drawing Sheets

FIG. 11
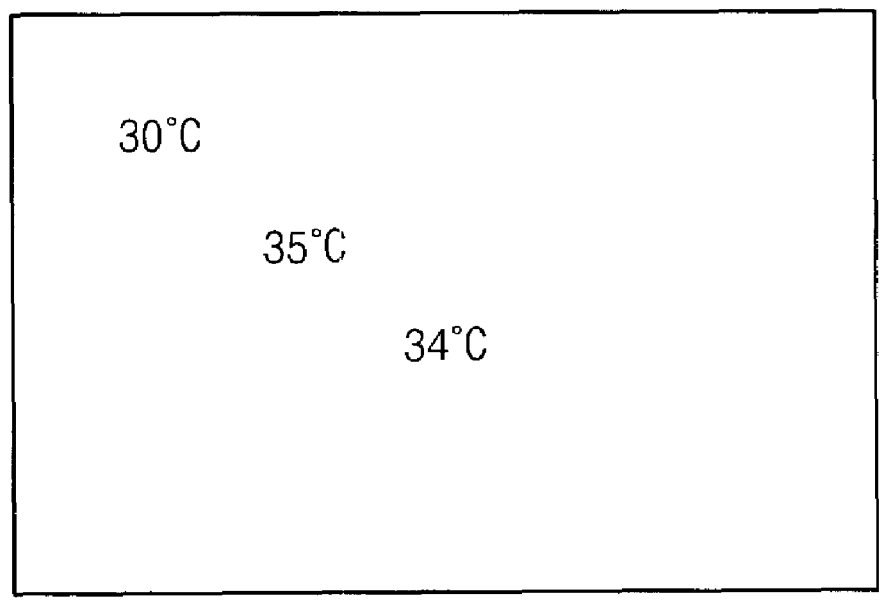
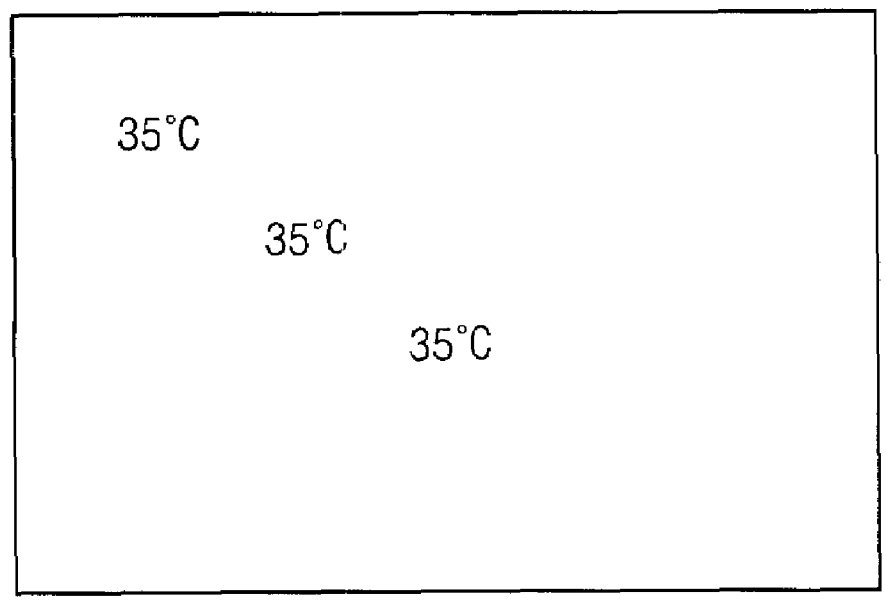

FIG. 12
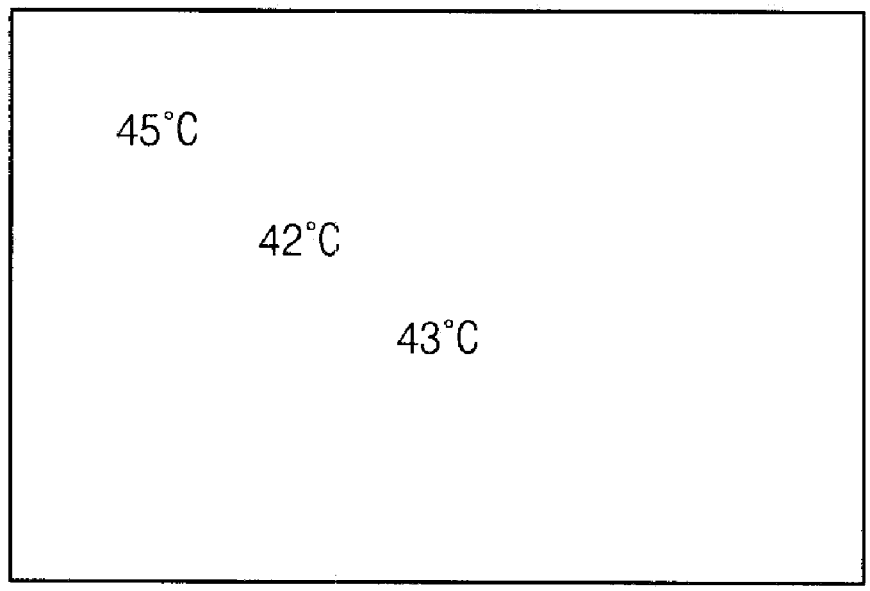
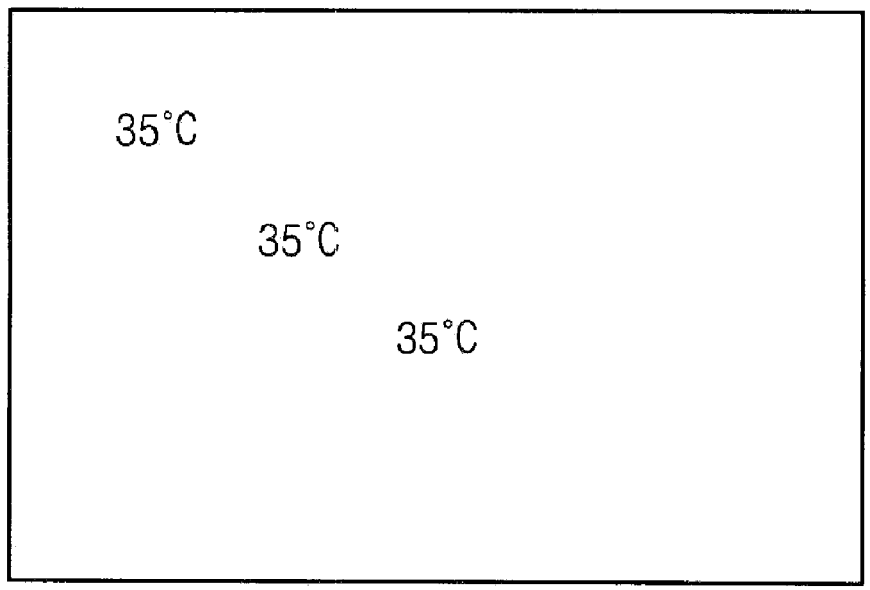

METHOD FOR DETECTING X-RAYS AND X-RAY DETECTOR PERFORMING THE METHOD

This application claims priority to Korean Patent Application No. 2007-131972, filed on Dec. 17, 2007, and all the benefits accruing therefrom under 35 U.S.C. § 119, the contents of which in its entirety are herein incorporated by reference.

BACKGROUND OF THE INVENTION

1. Field of the Invention

The present invention relates to a method for detecting X-rays and an X-ray detector performing the method. More particularly, the present invention relates to a method for detecting X-rays using a light-detecting diode and an X-ray detector performing the method.

2. Description of the Related Art

X-rays have short wavelengths and thereby transmit easily through many objects. An amount of X-ray which is transmitted through an object depends on a density of the object. Therefore, the amount of transmitted X-rays is based on an inner composition of the object, and the inner composition of the object is thereby indirectly observed based on the amount of the transmitted X-rays.

An X-ray detector is an apparatus which detects the amount of the transmitted X-rays. Thus, the X-ray detector indirectly displays the inner composition of the object after detecting the amount of the transmitted X-rays. Generally, the X-ray detector is used as a medical detection apparatus or as a nondestructive detection apparatus, for example.

The X-ray detector includes a plurality of light-detecting diodes which detect the amount of the X-rays transmitting through the object. Generally, when a reverse bias is applied to a light-detecting diode, the light-detecting diode generates a leakage current based on an amount of X-rays absorbed by the light-detecting diode. That is, the X-ray detector detects a level of the leakage current to quantify an intensity of the X-rays.

However, an image of the X-ray detector is distorted during an initial operational period of the X-ray detector, e.g., an operation period wherein the X-ray detector is first turned on. After the X-ray detector has "warmed up", however, e.g., has been driven for more than approximately 3 hours, the image of the X-ray detector is not distorted. As a result, an X-ray detector of the prior art does not detect an accurate image without being preheated for several hours.

BRIEF SUMMARY OF THE INVENTION

An exemplary embodiment of the present invention provides a method for detecting X-rays capable of accurately detecting an intensity of the X-rays during an initial operation, e.g., without preheating the X-ray detector.

The present invention also provides an X-ray detector which performs, e.g., utilizes, the method.

In an exemplary embodiment of the present invention, a uniformity of ambient temperatures of light-detecting diodes in an X-ray detector is increased in order to detect X-rays. X-rays irradiated into the X-ray detector are then detected.

More specifically, in an exemplary embodiment of the present invention, a method for detecting X-rays using an X-ray detector including an X-ray detecting part includes disposing a heat-circulating part adjacent to the X-ray detecting part. The X-ray detecting part includes light-detecting diodes. The method further includes detecting ambient temperatures of the light-detecting diodes, circulating heat in the heat-circulating part based on a result of the detecting the ambient temperatures of the light-detecting diodes, increasing a uniformity of the ambient temperatures of the light-detecting diodes, and detecting X-rays irradiated into the X-ray detector.

The detecting the ambient temperatures of the light-detecting diodes may include detecting the ambient temperatures of the light-detecting diodes based on a leakage current of the light-detecting diodes. The increasing the uniformity of ambient temperatures of the light-detecting diodes may include: comparing the ambient temperatures of the light-detecting diodes with a reference temperature; adjusting the ambient temperatures of the light-detecting diodes based on a result of the comparing the ambient temperatures; and one of increasing the adjusted ambient temperatures to the reference temperature and decreasing the adjusted ambient temperatures to the reference temperature.

In an exemplary embodiment, the reference temperature has a range from approximately 20° C. to approximately 40° C.

In an alternative exemplary embodiment of the present invention, an X-ray detector includes an X-ray detecting part and a heat-circulating part.

The X-ray detecting part includes a plurality of light-detecting diodes. The heat-circulating part is disposed adjacent to the X-ray detecting part, and circulates heat to increase a uniformity of ambient temperatures of each of light-detecting diode of the plurality of light-detecting diodes.

The heat-circulating part may include a heat-circulating plate including a heat-circulating path disposed therein, and the heat-circulating path may circulate heat to surfaces of the X-ray detector. The heat-circulating plate may include a metallic material having a high thermal conductivity. In an exemplary embodiment, the heat-circulating plate includes aluminum (Al).

A heat transfer material may be disposed in the heat-circulating path. The heat transfer material according to an exemplary embodiment has a liquid phase and/or a gas phase.

The X-ray detector may further include a temperature control part disposed adjacent to the heat-circulating part, and which exchanges heat with the heat-circulating part to increase the uniformity of the ambient temperatures of each of the light-detecting diodes.

The temperature control part may include a heat generating-part and a heat-absorbing part, each disposed adjacent to the heat-circulating part. The heat-generating part generates heat and transfers the heat to the heat-circulating part to increase the ambient temperatures of each of the light-detecting diodes. The heat-absorbing part absorbs heat from the heat-circulating part to decrease the ambient temperatures of each of the light-detecting diodes.

The temperature control part may include an air fan disposed under the heat-circulating part to transfer heat from the heat-circulating part to outside the X-ray detecting part. The temperature control part may further include a heat transfer member disposed between the air fan and the heat-circulating part. A first surface of the heat transfer member is disposed on the heat-circulating part to transfer the heat of the heat-circulating part to the outside the X-ray detecting part via the air fan. The heat transfer member may further include a second surface opposite the first surface and including a concavo-convex part to increase a surface area of the heat transfer member.

In an alternative exemplary embodiment, the temperature control part may include a thermoelectric semiconductor disposed adjacent to a bottom surface of the heat-circulating part, to absorb heat from the heat-circulating part and/or supply heat to the heat-circulating part. The temperature control part may further include an air fan disposed adjacent to the thermoelectric semiconductor to supply the thermoelectric semiconductor with air.

The X-ray detector may further include a temperature control circuit part electrically connected to the temperature control part to control the temperature control part. The temperature control circuit part is electrically connected to the X-ray detecting part to receive a signal which corresponds to the ambient temperature of each of the light-detecting diodes, and which controls heat exchange between the temperature control part and the heat-circulating part based on the signal.

The X-ray detecting part according to an exemplary embodiment of the present invention includes a detection panel, a driving printed circuit board ("PCB") and a flexible printed circuit board ("FPCB"). The detection panel comprises a plurality of light-detecting diodes, thin-film transistors ("TFTs") electrically connected to light-detecting diodes of the plurality of light-detecting diodes and signal lines electrically connected to the TFTs. The driving PCB is disposed adjacent to a bottom surface of the heat-circulating part. The FPCB electrically connects the detection panel to the driving PCB.

According to exemplary embodiments present invention, a uniformity of ambient temperatures of light-detecting diodes in an X-ray detector is increased before X-rays are irradiated into the X-ray detector, and the X-ray detector therefore accurately detects an intensity of the X-rays during initial operation of the X-ray detector.

BRIEF DESCRIPTION OF THE DRAWINGS

The above and other aspects, features and advantages of the present invention will become more readily apparent by describing in further detail exemplary embodiments thereof with reference to the accompanying drawings, in which:

FIGS. 11 and 12 are top plan views illustrating variations among ambient temperatures of light-detecting diodes of an X-ray detector according to an exemplary embodiment of the present invention.

DETAILED DESCRIPTION OF THE INVENTION

Figure 1:
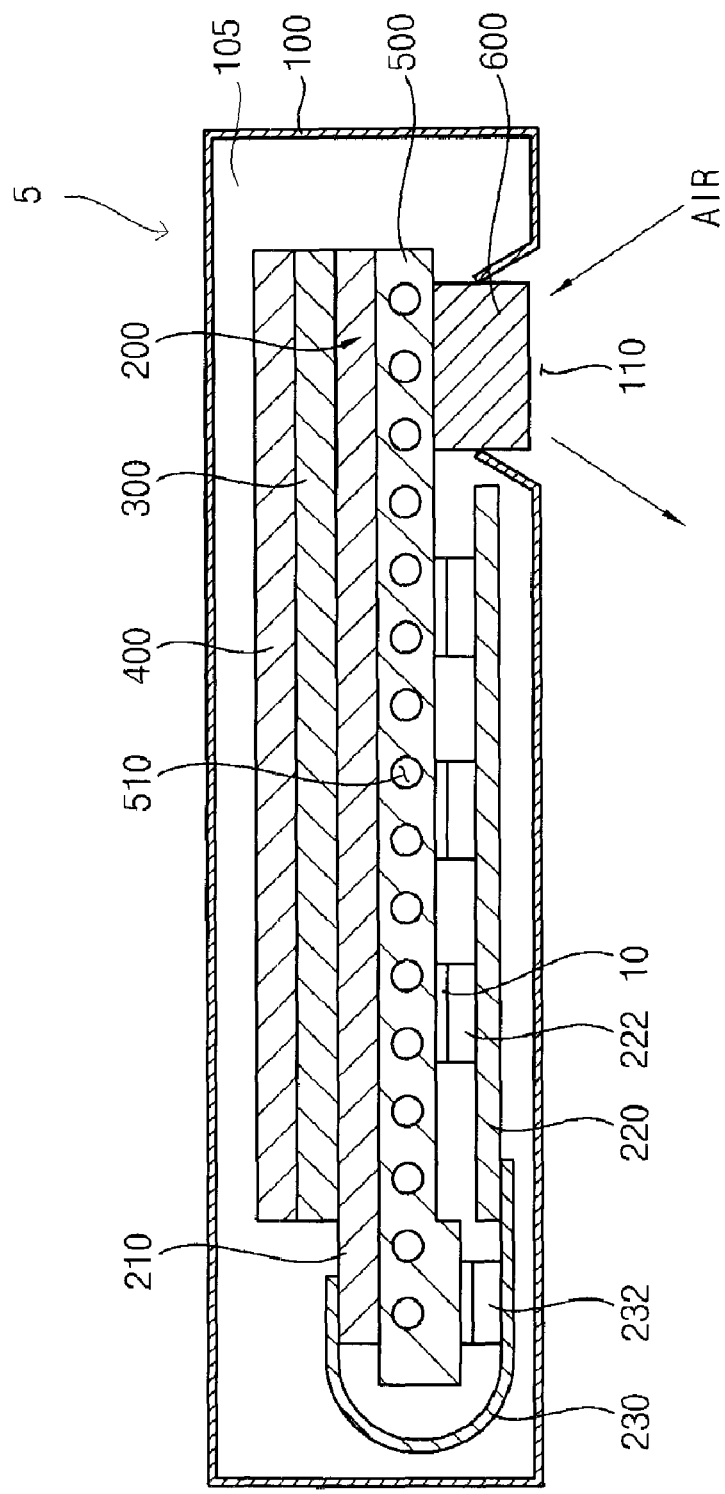
FIG. 1 is a cross-sectional view of an X-ray detector according to an exemplary embodiment of the present invention.

The invention will now be described more fully hereinafter with reference to the accompanying drawings, in which exemplary embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the device in one of the figures were turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Exemplary embodiments of the present invention are described herein with reference to cross section illustrations which are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes which result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention.

Hereinafter, exemplary embodiments of the present invention will be described in further detail with reference to the accompanying drawings.

FIG. 1 is a cross-sectional view of an X-ray detector according to an exemplary embodiment of the present invention.

Referring to FIG. 1, an X-ray detector 5 according to an exemplary embodiment of the present invention includes a container 100, an X-ray detecting part 200, an X-ray conversion part 300, a protective cover 400, a heat-circulating part 500 and a temperature control part 600.

The container 100 defines a containing space 105 which receives the X-ray detecting part 200, the X-ray conversion part 300, the protective cover 400, the heat-circulating part 500 and the temperature control part 600, as shown in FIG. 1.

Thus, the X-ray detecting part 200 is disposed in the container 100, and detects an intensity of X-rays (not shown) received from outside the X-ray detector 5, e.g., from an external source (not shown). In an exemplary embodiment, the X-ray detecting part 200 includes a detection panel 210, a driving printed circuit board ("PCB") 220 and a flexible printed circuit board ("FPCB") 230.

The detection panel 210 includes a plurality of light-detecting diodes (not shown) for detecting the intensity of the X-rays, a plurality of thin-film transistors ("TFTs") (FIG. 2) electrically connected to the light-detecting diodes, and a plurality of signal lines (FIG. 2) electrically connected to the TFTs.

As shown in FIG. 1, the driving PCB 220 is disposed substantially under the detection panel 210. The FPCB 230 is bent, e.g., curves, to electrically connect the detection panel 210 to the driving PCB 220.

At least one driving device 222 which controls the detection panel 210 is disposed on the driving PCB 220. In an exemplary embodiment, the driving device 222 includes a timing controller (not shown), a power source device (not shown), and/or an alternating current/direct current ("AC/DC") converter, for example, but alternative exemplary embodiments are not limited thereto. The driving device 222 is disposed on a surface of the driving PCB 220 which substantially faces the detection panel 210, as shown in FIG. 1.

At least one signal output device 232 electrically connected to the signal lines (FIG. 2) of the detection panel 210 is disposed on the FPCB 230. The signal output device 232 converts a sensing signal generated in the detection panel 210 into an output signal, and outputs the output signal to the signal lines. In an exemplary embodiment, the signal output device 232 is disposed on a surface of the FPCB 230 substantially facing the detection panel 210, a shown in FIG. 1. In an alternative exemplary embodiment, the signal output device 232 may be disposed on a different portion of the FPCB 230 or, alternatively, on the driving PCB 220, but alternative exemplary embodiments are not limited thereto.

The X-ray conversion part 300 is disposed substantially adjacent to an upper surface of the detection panel 210, as viewed in FIG. 1. The X-ray conversion part 300 converts the X-rays (not shown) received from outside the X-ray detector 5 into light which is then detected by the detection panel 210. In an exemplary embodiment, the X-ray conversion part 300 includes a scintillator, for example, which converts the X-rays into the light and, more specifically, into a green light, although alternative exemplary embodiments are not limited thereto.

In an alternative exemplary embodiment, the detection panel 210 may directly detect the intensity of the X-rays, and the X-ray conversion part 300 may therefore be omitted.

The protective cover 400 is disposed substantially adjacent to an upper surface of the X-ray conversion part 300 to protect the X-ray conversion part 300. When the X-ray conversion part 300 is omitted, the protective cover 400 protects an upper surface of the detection panel 210.

The protective cover 400 includes a material which easily transmits the X-rays therethrough. Likewise, an upper portion of the container 100 facing the protective cover 400 includes a material which easily transmits the X-rays therethrough.

The heat-circulating part 500 is disposed substantially adjacent to a lower surface of the detection panel 210, e.g., opposite the upper surface of the detection panel 210, as viewed in FIG. 1. More specifically, the heat-circulating part 500 is disposed substantially between the detection panel 210 and the driving PCB 220. In addition, the heat-circulating part 500 is attached to the lower surface of the detection panel 210 with an adhering material 10, e.g., an adhering member 10.

In an exemplary embodiment, the heat-circulating part 500 circulates heat to effectively increase a temperature uniformity of surfaces of the detection panel 210. Specifically, the heat-circulating part 500 increases uniformity of ambient temperatures of each surface of the detection panel 210, as well as the light-detecting diodes (not shown) of the detection panel 210.

Figure 2:
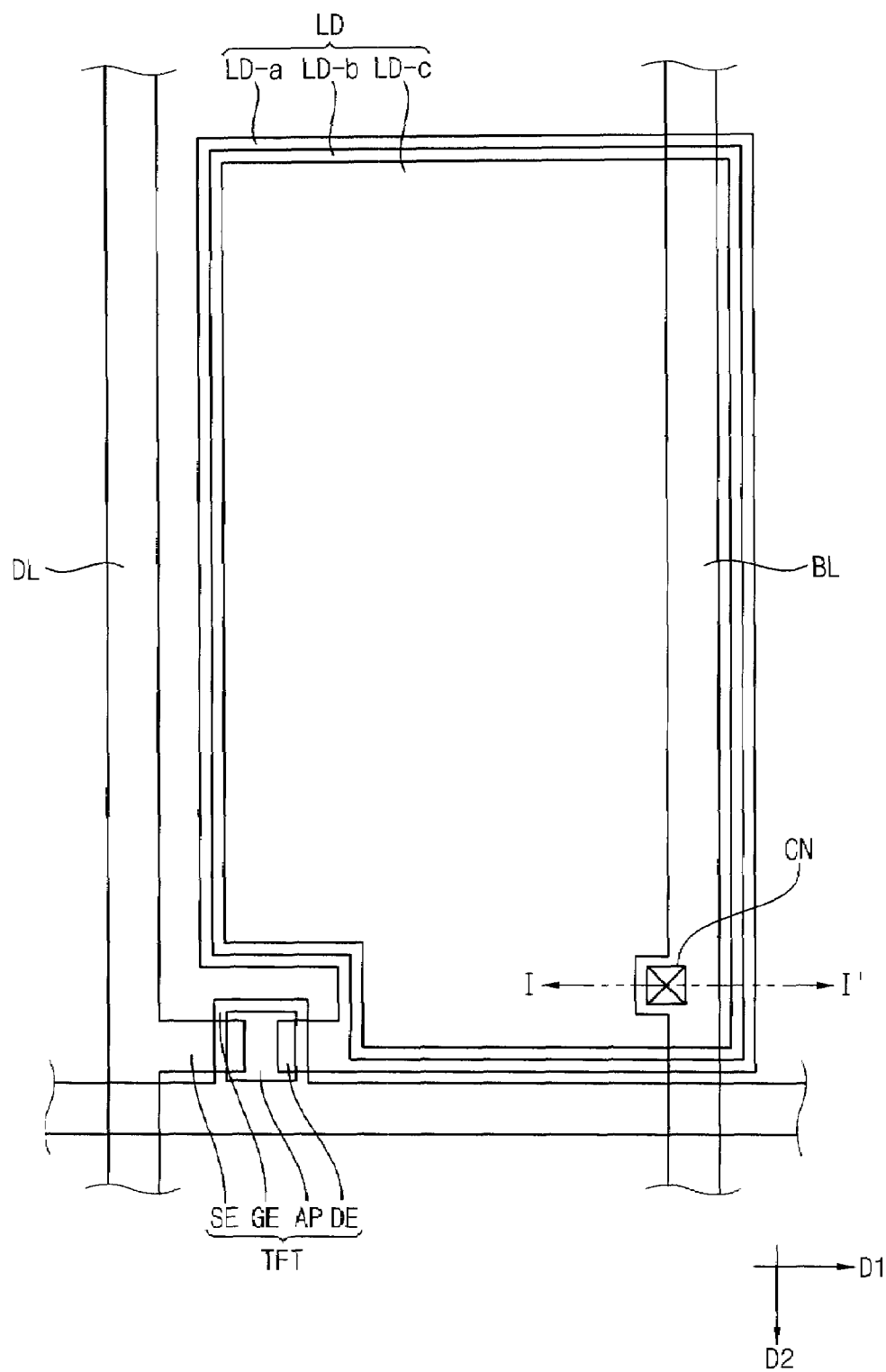
FIG. 2 is an enlarged plan view of a pixel of an X-ray detecting part of the X-ray detector according to the exemplary embodiment shown in FIG. 1.

In an exemplary embodiment, the heat-circulating part 500 includes a heat-circulating plate including a heat-circulating pipe 510 which circulates heat to the surfaces of the detection panel 210. As shown in FIG. 2, in one exemplary embodiment the heat circulating plate is the portion of the heat circulating part 500 not removed to make space for the heat-circulating pipe 510. The heat-circulating plate may further include a metallic material having a high thermal conductivity. For example, the metallic material used for the heat-circulating plate may include aluminum (Al), for example, but alternative exemplary embodiments are not limited thereto.

The heat-circulating plate may be formed by a die-casting method. Alternately, the heat-circulating plate may be formed by combining plates, but alternative exemplary embodiments of the present invention are not limited thereto.

The driving device 222 and the signal output device 232 are disposed substantially adjacent to a lower surface of the heat-circulating part 500, as shown in FIG. 1. Further, the driving device 222 and the signal output device 232 are attached to the bottom surface of the heat-circulating part 500 with the adhering member 10. Thus, the heat-circulating part 500 absorbs heat generated from the driving device 222 and the signal output device 232, for example, and distributes the absorbed heat to the surfaces of the heat-circulating part 500.

Still referring to FIG. 1, the temperature control part 600 is disposed in an aperture 110 located in the lower surface of the container 100 and is substantially adjacent to the heat-circulating part 500 to effectively exchange heat with the heat-circulating part 500. In an exemplary embodiment, the aperture 110 is a heat exchange opening 110, and the temperature control part 600 is disposed substantially adjacent to the lower surface of the heat-circulating part 500 such that the temperature control part 600 does not overlap the driving PCB 220 and/or the FPCB 230, as shown in FIG. 1.

The temperature control part 600 supplies heat to the heat-circulating part 500 or absorbs heat from the heat-circulating part 500, such that the temperature control part 600 increases the uniformity of temperatures of the light-detecting diodes in the detection panel 210. In an exemplary embodiment, the ambient temperatures are substantially equal to a reference temperature.

The temperature control part 600 is exposed to outside air AIR, which flows, e.g., circulates, proximate to the X-ray detector 5 as indicated by the arrows in FIG. 1, through the heat exchange opening 110 of the container 100, so that the temperature control part 600 effectively exchanges heat to or from an area outside the X-ray detector 5.

Figure 3:
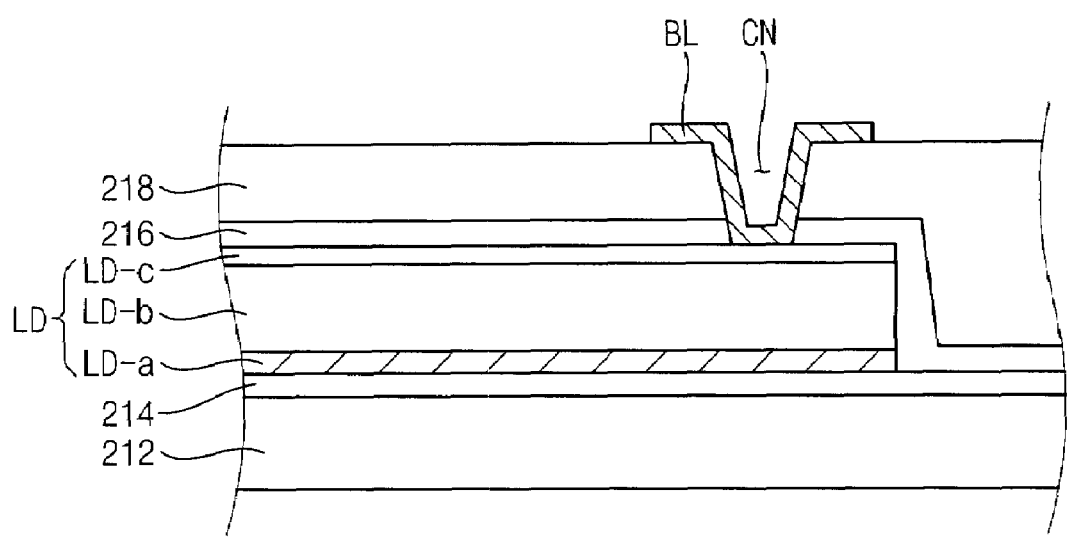
FIG. 3 is a partial cross-sectional view taken along line I-I' of FIG. 2.

FIG. 2 is an enlarged plan view of a pixel of an X-ray detecting part of the X-ray detector 5 according to the exemplary embodiment shown in FIG. 1. FIG. 3 is a partial cross-sectional view taken along line I-I' of FIG. 2.

Referring to FIGS. 1 through 3, the detection panel 210 according to an exemplary embodiment includes a base plate 212, a gate insulation layer 214, a plurality of TFTs, a plurality of light-detecting diodes LD, a passivation layer 216, an organic insulation layer 218, a gate line GL, a data line DL and a bias line BL. Each TFT of the TFTs includes a gate electrode GE, an active pattern AP, a source electrode SE and a drain electrode DE. Each light-detecting diode LD of the plurality of light-detecting diodes LD includes a first electrode LD-a, a light conduction layer LD-b and a second electrode LD-c.

In an exemplary embodiment, the base plate 212 has a substantially rectilinear shape, such as a plate shape, for example. In an exemplary embodiment, the base plate 212 includes a transparent material such as glass, quartz or synthetic resin, for example, but alternative exemplary embodiments are not limited thereto.

The gate line GL is formed on the base plate 212 in substantially a first direction D1. The gate line GL includes aluminum (Al) or aluminum alloy, for example, but alternative exemplary embodiments are not limited thereto.

The gate electrode GE extends from the gate line GL on the base plate 212. In an exemplary embodiment, the gate electrode GE extends opposite a second direction D2, substantially perpendicular to the first direction D1, e.g., away from the gate line GL, as shown in FIG. 2. In an exemplary embodiment, the gate electrode GE includes substantially the same material as the gate line GL.

The gate insulation layer 214 is formed on the base plate 212 to cover at least a portion of the gate line GL. The gate insulation layer 214 includes a material such as silicon nitride ("SiNx") or silicon oxide ("SiOx"), for example, but alternative exemplary embodiments of the present invention are not limited thereto.

The active pattern AP is disposed on the gate insulation layer 214 to overlap at least a portion of the gate electrode GE. Further, the active pattern AP includes a channel layer (not shown) formed on the gate insulation layer 214, and an ohmic contact layer (not shown) formed on the channel layer. The channel layer includes amorphous silicon ("a-Si"), for example, and the ohmic contact layer includes n+ amorphous silicon ("n+ a-Si"), for example, implanted by ions at a high concentration, but alternative exemplary embodiments are not limited thereto.

The data line DL is formed in substantially the second direction D2 on the gate insulation layer 214. In an exemplary embodiment, the data line DL includes molybdenum (Mo), a molybdenum-tungsten ("MoW") alloy, chromium (Cr), tantalum (Ta) and/or titanium (Ti), for example. In addition, the data line DL may have a multilayer structure which includes a conduction layer (not shown) having a low resistance and a contact layer (not shown) having a high contact characteristic. The data line DL having the multilayer structure may include an aluminum-chromium ("Al/Cr") alloy as the conduction layer, and an aluminum-molybdenum ("Al/Mo") alloy as the contact layer, for example, but alternative exemplary embodiments are not limited to the foregoing materials or arrangement thereof.

The source electrode SE extends from the data line DL on the gate insulation layer 214. Specifically, the source electrode SE extends substantially along the first direction D1 from the data line DL, a shown in FIG. 2. A portion of the source electrode SE is disposed above the active pattern AP to overlap the active pattern AP. Similarly, the drain electrode DE is formed on the gate insulation layer 214 separate from, e.g., substantially facing, the source electrode SE, as shown in FIG. 2. Further, a portion of the drain electrode DE is disposed above the active pattern AP to overlap the active pattern AP. In an exemplary embodiment, the source electrode SE and the drain electrode DE include substantially the same material or materials as the data line DL.

The ohmic contact layer (not shown) of the active pattern AP makes separate electrical contact with each of the drain electrode DE and the source electrode SE, e.g., in an exemplary embodiment, the ohmic contact layer is formed in regions only under each of the drain electrode DE and the source electrode SE.

The first electrode LD-a of the light-detecting diode LD is formed on the gate insulation layer 214, and is separate from the data line DL, as shown in FIG. 2. In addition, the first electrode LD-a in an alternative exemplary embodiment is formed in a pixel area, and does not overlap the gate line GL. The first electrode LD-a is electrically connected to the drain electrode DE. In an exemplary embodiment, first electrode LD-a include substantially the same material or materials as the drain electrode DE.

The light conduction layer LD-b of the light-detecting diode LD is formed on the first electrode LD-a. A size of the light conduction layer LD-b may be substantially the same as a size as the first electrode LD-a, but alternative exemplary embodiments are not limited thereto.

The light conduction layer LD-b may include an n-type silicon layer and a p-type silicon layer, and may further include an intrinsic silicon layer formed between the n-type silicon layer and the p-type silicon layer. More specifically, the n-type silicon layer is formed on the first electrode LD-a, and includes an amorphous silicon layer having n-type impurities, for example. The intrinsic silicon layer is formed on the n-type silicon layer. The intrinsic silicon layer may include an amorphous silicon layer not having impurities, but alternative exemplary embodiments are not limited thereto. The p-type silicon layer is formed on the intrinsic silicon layer. The p-type silicon layer may include an amorphous silicon layer having p-type impurities, for example.

The second electrode LD-c of the light-detecting diode LD is formed on the light conduction layer LD-b, e.g., the second electrode LD-c is formed on the p-type silicon layer. In an exemplary embodiment, the second electrode LD-c includes a transparent conductive material such that X-rays are applied to, e.g., reach, the light conduction layer LD-b disposed between the first electrode LD-a and the second electrode LD-c of the light-detecting diode LD. For example, the second electrode LD-c may include indium tin oxide ("ITO") or indium zinc oxide ("IZO"), but alternative exemplary embodiments are not limited thereto.

The passivation layer 216 is formed on the gate insulation layer 214 to cover at least a portion of the light-detecting diode LD, the TFT and the data line DL. The passivation layer 216 may include, for example, silicon nitride ("SiNx") or silicon oxide ("SiOx"), but is not limited thereto.

The organic insulation layer 218 is formed on the passivation layer 216, a shown in FIG. 3. In an exemplary embodiment of the present invention, a thickness of the organic insulation layer 216 is greater than or equal to approximately 2 μm, but alternative exemplary embodiments are not limited thereto. An upper surface of the organic insulation layer 216 may be formed to be substantially parallel with the base plate 212, as shown in FIG. 3.

The passivation layer 216 and the organic insulation layer 218 have a contact hole CN therethrough which exposes a portion of the second electrode LD-c.

The bias line BL is formed on the organic insulation layer 216 substantially along the second direction D2. The bias line BL is in electrical contact with the second electrode LD-c through the contact hole CN. In an exemplary embodiment, a reverse bias is applied to the light-detecting diode LD through the bias line BL using, for example, a reverse biasing voltage.

In an alternative exemplary embodiment, only one of the passivation layer 216 and the organic insulation layer 218 are formed on the base plate 212. For example, only the passivation layer 216 is formed on the base plate 212 or, alternatively, only the organic insulation layer 216 is formed on the base plate 212.

Figure 4:
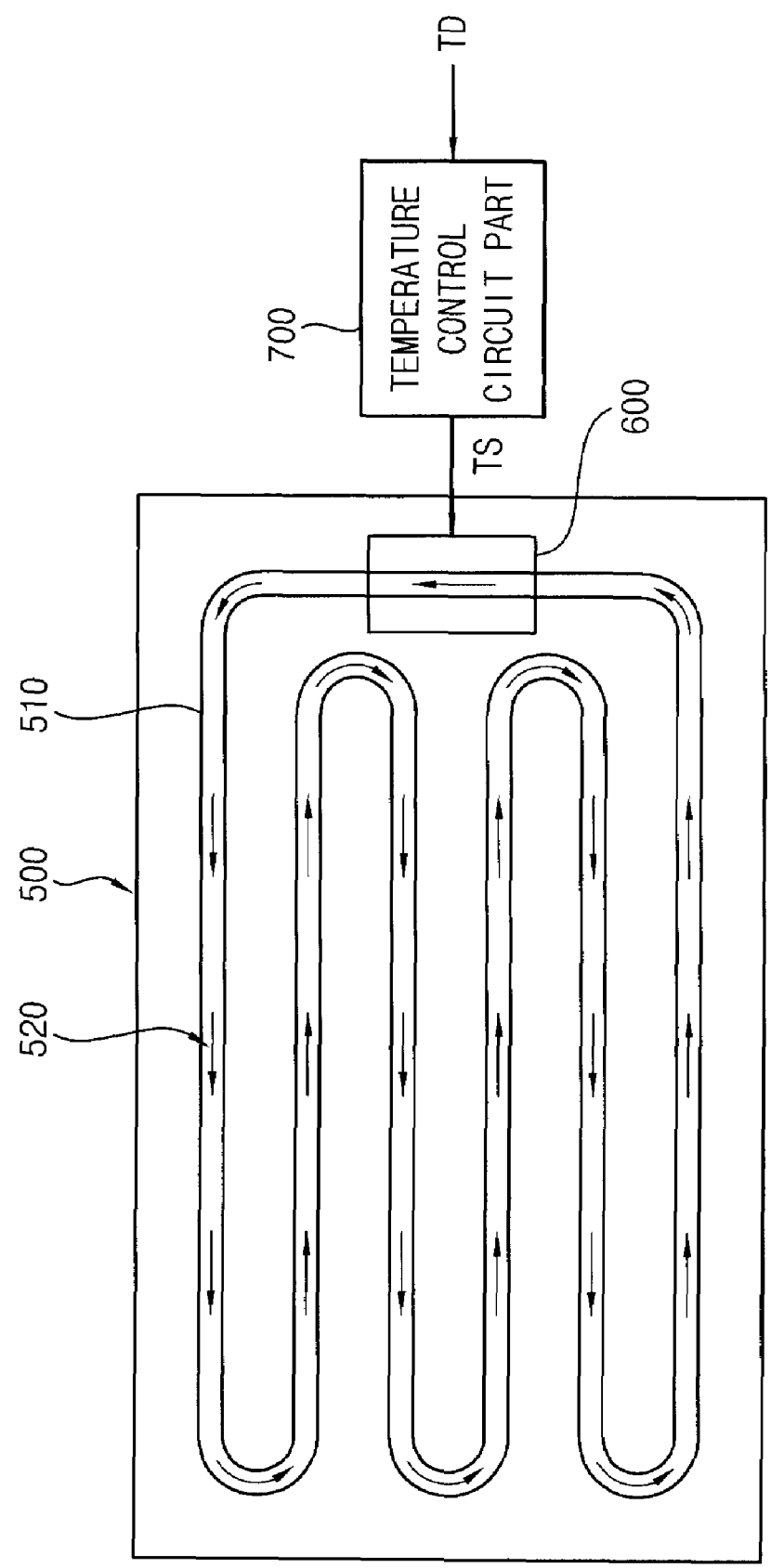
FIG. 4 is a top plan view illustrating a relationship between a heat-circulating part, a temperature control part and a temperature control circuit part of the X-ray detector according to the exemplary embodiment shown in FIG. 1.

FIG. 4 is a top plan view illustrating a relationship between a heat-circulating part, a temperature control part and a temperature control circuit part of the X-ray detector 5 according to the exemplary embodiment shown in FIG. 1. The same reference characters in FIG. 4 refer to the same or like components as in FIG. 1, and any repetitive detailed description will hereinafter be omitted.

Referring to FIGS. 1 and 4, the heat-circulating path 510 is formed at the entire surface of the heat-circulating part 500 to be linked. A heat transfer material 520 which transfers heat is disposed in the heat-circulating path 510. The heat transfer material 520 moves through the heat-circulating path 510 (as shown by arrows in FIG. 4) to effectively distribute heat to an entire surface of the detection panel 210 (FIG. 1). Therefore, the detection panel 210 has a substantially uniform temperature, e.g., the same temperature, over the entire surface of the detection panel 210.

In an exemplary embodiment, the heat transfer material 520 includes at least one of a liquid material and gaseous material. For example, the heat transfer material 520 may be a heat transfer gas and/or a heat transfer liquid, such as used in a refrigerator, for example.

The temperature control part 600 is disposed art a peripheral edge portion of the bottom surface of the heat-circulating part 500 to substantially overlap a portion of the heat-circulating path 510, as shown in FIG. 4. Thus, the temperature control part 600 supplies heat to the heat transfer material 520 in the heat-circulating path 510 or, alternatively, absorbs heat from the heat transfer material 520, based on a temperature control signal TS, described in further detail below.

When the temperature control part 600 supplies heat to the heat transfer material 520, the heat transfer material 520 distributes the heat supplied from the temperature control part 600 to the entire surface of the heat-circulating part 500 such that a uniform temperature of the entire surface of the detection panel 220 (FIG. 1) is increased.

In contrast, when the temperature control part 600 absorbs heat from the heat transfer material 520, the heat transfer material 520 transfers the heat of the heat-circulating part 500 to the temperature control part 600 such that the uniform temperature of the entire surface of the detection panel 220 is decreased.

The X-ray detector 5 according to an exemplary embodiment may further include a temperature control circuit part 700 for controlling the temperature control part 600.

Specifically, the temperature control circuit part 700 generates the temperature control signal TS which controls the temperature control part 600, and applies the temperature control signal TS to the temperature control part 600. Thus, the temperature control part 600 supplies heat to the heat-circulating part 500 or, alternatively, absorbs heat from the heat-circulating part 500 (as described in greater detail above) based on the temperature control signal TS.

Furthermore, the X-ray detecting part 200 (FIG. 2) generates a temperature detecting signal TD corresponding to an ambient temperature of the light-detecting diode LD in the detection panel 210, and applies the temperature detecting signal TD to the temperature control circuit part 700. More specifically, when X-rays are not applied to the X-ray detecting part 200, the X-ray detecting part 200 detects the ambient temperature of the light-detecting diode LD using the light-detecting diode, LD such that the X-ray detecting part 200 generates the temperature detecting signal TD based thereon.

The temperature control circuit part 700 compares the ambient temperature of the light-detecting diode LD with a reference temperature set using the temperature detecting signal TD applied from the X-ray detecting part 200, such that the temperature control circuit part 700 controls the temperature control part 500 based on a value of the compared temperatures.

For example, when the ambient temperature of the light-detecting diode LD is greater than the reference temperature, the temperature control circuit part 700 controls the temperature control part 600 such that the temperature control part 600 absorbs heat from the heat-circulating part 500. On the other hand, when the ambient temperature of the light-detecting diode LD is lower than the reference temperature, the temperature control circuit part 700 controls the temperature control part 600 such that the temperature control part 600 supplies heat to the heat-circulating part 500.

Figure 5:
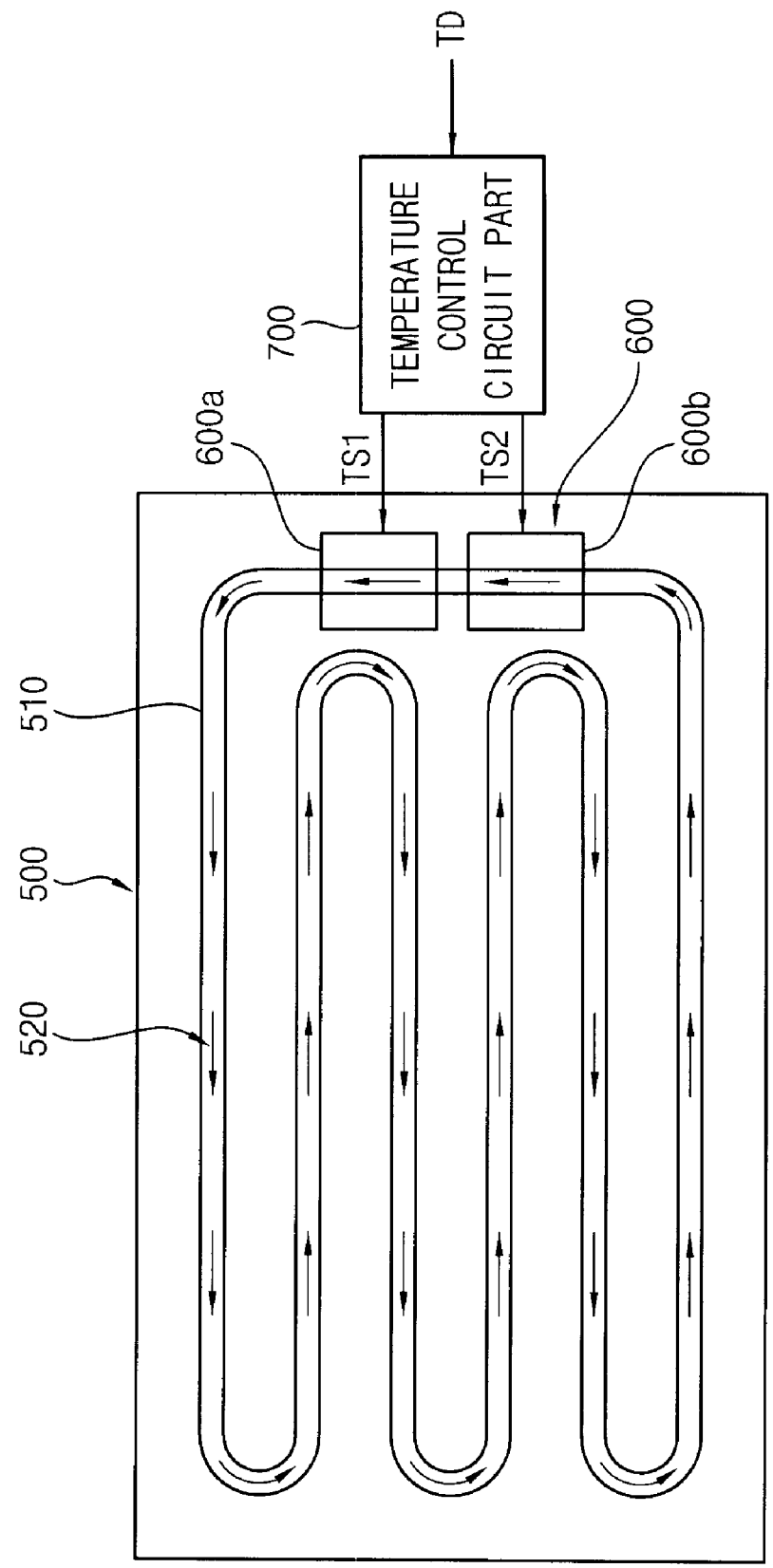
FIG. 5 is a top plan view illustrating a relationship between a heat-circulating part, a temperature control part and a temperature control circuit part in an X-ray detector according to an alternative exemplary embodiment of the present invention.

FIG. 5 is a top plan view illustrating a relationship between a heat-circulating part, a temperature control part and a temperature control circuit part in an X-ray detector according to an alternative exemplary embodiment of the present invention. The same reference characters in FIG. 5 refer to the same or like components as in FIGS. 1 and 4, and any repetitive detailed description will hereinafter be omitted. Further, an X-ray detector 5, shown in FIG. 5, is substantially the same as the X-ray detector 5 of FIG. 4 except for the temperature control part 600, as will now be described in further detail.

Referring FIG. 5, the temperature control part 600 according to an alternative exemplary embodiment of the present invention includes a heat-generating part 600a and a heat-absorbing part 600b.

The heat-generating part 600a supplies heat to the heat-circulating part 500 to increase an ambient temperature of the light-detecting diode LD.

The heat-absorbing part 600b absorbs heat from the heat-circulating part 500 to decrease the ambient temperature of the light-detecting diode LD.

The temperature control circuit part 700 generates a first temperature control signal TS1 which controls the heat-generating part 600a, and a second temperature control signal TS2 which controls the heat-absorbing part 600b.

More specifically, when the ambient temperature of the light-detecting diode LD is less than the reference temperature, the temperature control circuit part 700 controls the heat-generating part 600a such that the heat generating part 600a supplies heat to the heat-circulating part 500. On the other hand, when the ambient temperature of the light-detecting diode LD is greater than the reference temperature, the temperature control circuit part 700 controls the heat-absorbing part 600b such that the heat-absorbing part 600b absorbs heat from the heat-circulating part 500.

In an exemplary embodiment, the driving device 222 (FIG. 1) disposed on the driving PCB 220, and the signal output device 232 disposed on the FPCB 230 supply heats to the heat-circulating part 500. Thus, the driving device 222 and the signal output device 232 supply heat to the heat-circulating part 500 instead of, or in addition to, the heat generating part 600a.

Figure 6:
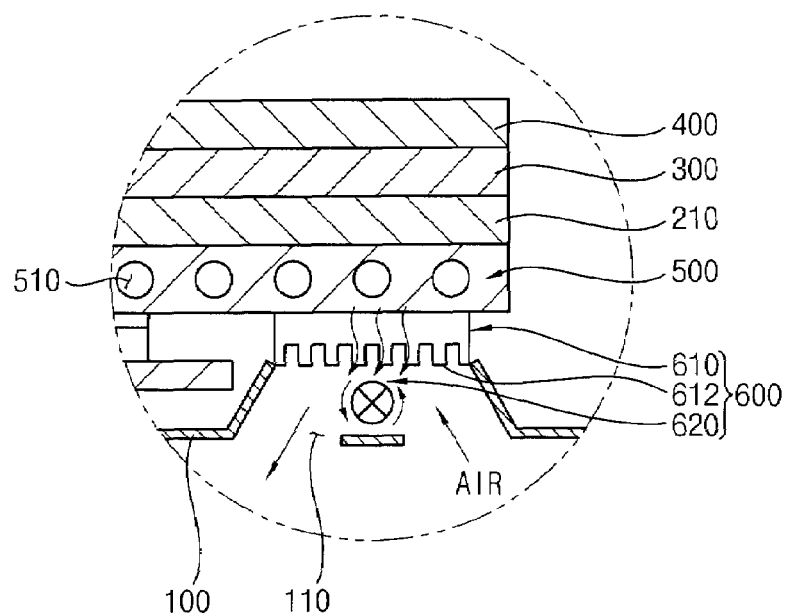
FIG. 6 is an enlarged partial cross-sectional view of a portion of an X-ray detector according to yet another alternative exemplary embodiment of the present invention.

FIG. 6 is an enlarged partial cross-sectional view of a portion of an X-ray detector according to yet another alternative exemplary embodiment of the present invention. The same reference characters in FIG. 6 refer to the same or like components as in FIGS. 1 and 5, and any repetitive detailed description thereof has hereinafter been omitted. Further, an X-ray detector 5, as shown in FIG. 6, is substantially the same as the X-ray detector 5 of FIG. 1 except for the temperature control part as will be described in further detail below.

Referring to FIG. 6, a temperature control part 600 according to an alternative exemplary embodiment of the present invention includes a heat transfer member 610 and an air fan 620.

The heat transfer member 610 is adjacent to the lower surface of the heat-circulating part 500. More specifically, a first surface of the heat transfer member 610 is attached to a peripheral edge portion of the lower surface of the heat-circulating part 500. The heat transfer member 610 may have a concavo-convex part 612 which is formed at a second surface opposite to the first surface of the heat transfer member 610 to increase a surface area thereof. The heat transfer member 610 may include a metallic material having a high thermal conductivity such as aluminum (Al), for example, but alternative exemplary embodiments are not limited thereto.

The air fan 620 is disposed under the heat transfer member 610 to supply outside air AIR to the concavo-convex part 612 of the second surface of the heat transfer member 610, as shown in FIG. 6. Thus, the outside air AIR moves to the concavo-convex part 612 through the heat exchange opening 110 of the container 100 due to rotation of the air fan 620. The outside air AIR absorbs heat from the concavo-convex part 612.

Since an internal temperature of the container 100, e.g., a temperature of the containing space 105, is generally greater than an external temperature of the container 100, the heat-circulating part 500 emits heat from the X-ray detector 5 through the temperature control part 600 so that the ambient temperature of the light-detecting diode LD is effectively decreased.

Figure 7:
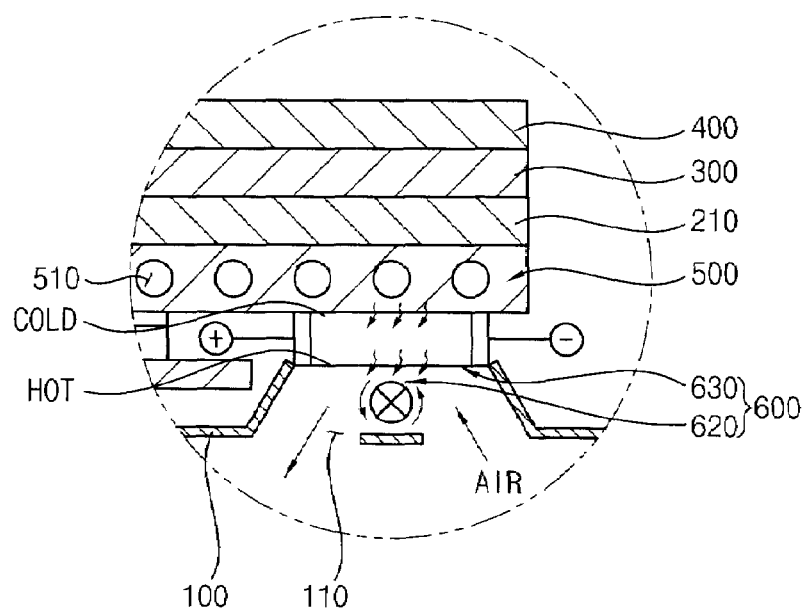
FIG. 7 is an enlarged partial cross-sectional view of a portion of an X-ray detector according to still another alternative exemplary embodiment of the present invention.

FIG. 7 is an enlarged partial cross-sectional view of a portion of an X-ray detector according to still another alternative exemplary embodiment of the present invention. The same reference characters in FIG. 7 refer to the same or like components as in FIGS. 1 and 6, and any repetitive detailed description thereof has hereinafter been omitted. Further, an X-ray detector 5, shown in FIG. 7, is substantially the same as the X-ray detector 5 of FIG. 1 except for the temperature control part, as will now be described in further detail.

Referring to FIG. 7, a temperature control part 600 according to an alternative exemplary embodiment of the present invention includes a thermoelectric semiconductor 630 and the air fan 620.

The thermoelectric semiconductor 630 is disposed substantially adjacent to the lower surface of the heat-circulating part 500. More specifically, a first surface of the thermoelectric semiconductor 630 is attached to a peripheral edge portion of the lower surface of the heat-circulating part 500, as shown in FIG. 7.

When a forward bias, e.g., as shown by positive ("+") and negative ("−") voltages in FIG. 7, is applied to the thermoelectric semiconductor 630, a temperature at a first side of the thermoelectric semiconductor 630 which faces the heat-circulating part 500 is decreased, whereas a temperature at a second side, facing the first side, of the thermoelectric semiconductor 630 is increased. Thus, the thermoelectric semiconductor 630 quickly absorbs heat from the heat-circulating part 500.

The air fan 620 is disposed under the thermoelectric semiconductor 630 to supply outside air AIR to an opposite side (with respect to the air fan 620) of the thermoelectric semiconductor 630. Thus, the outside air AIR absorbs heat from the opposite side of the thermoelectric semiconductor 630, and transfers the absorbed heat outside the container 100 of the X-ray detector 5 according to an exemplary embodiment.

Figure 8:
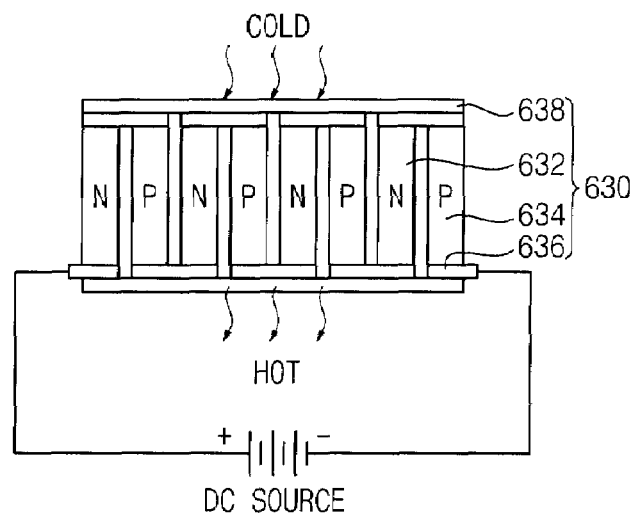
FIG. 8 is an enlarged cross-sectional view of a thermoelectric semiconductor of the X-ray detector according to the exemplary embodiment shown in FIG. 7.

FIG. 8 is an enlarged cross-sectional view of a thermoelectric semiconductor of the X-ray detector 5 according to the exemplary embodiment shown in FIG. 7.

Referring to FIG. 8, the thermoelectric semiconductor 630 according to an exemplary embodiment includes n-type semiconductors 632, p-type semiconductors 634, electrodes 636 and insulation layers 638.

The n-type semiconductors 632 and the p-type semiconductors 634 are disposed substantially parallel to one another in an alternating manner, as shown in FIG. 8. The electrodes 636 sequentially connect adjacent n-type semiconductors 632 and p-type semiconductors 634 in electrical series.

The insulation layers 638 cover the electrodes 636 of the n-type semiconductors 632 and the p-type semiconductors 634 to protect the electrodes 636.

When a forward bias is applied to electrodes 636 disposed at opposite peripheral edges of the thermoelectric semiconductor 630, a temperature at a first side of the thermoelectric semiconductor 630 is decreased, whereas a temperature at a second side facing the first side of the thermoelectric semiconductor 630 is increased.

Figure 9:
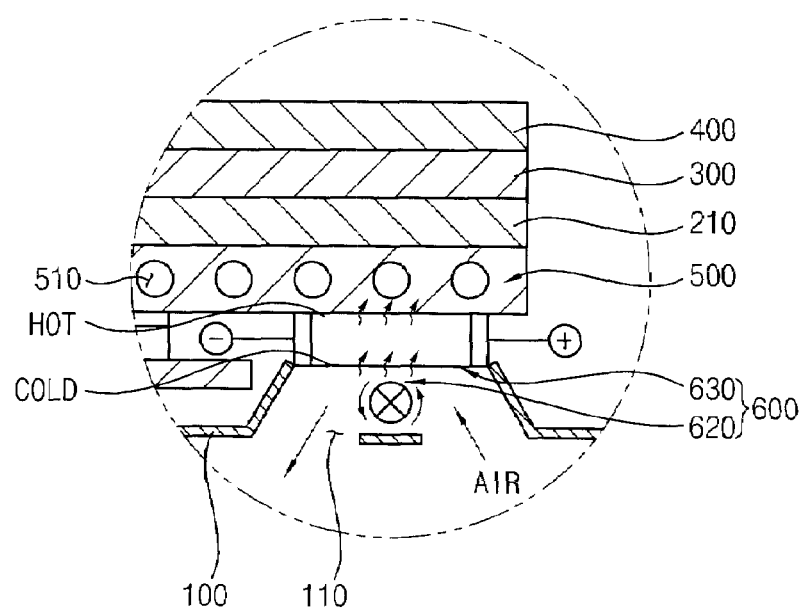
FIG. 9 is an enlarged partial cross-sectional view illustrating a state of the thermoelectric semiconductor of the X-ray detector according to the exemplary embodiment shown in FIG. 7 when a reverse bias is applied to the thermoelectric semiconductor.

FIG. 9 is an enlarged partial cross-sectional view illustrating a state of the thermoelectric semiconductor of the X-ray detector 5 according to the exemplary embodiment shown in FIG. 7 when a reverse bias is applied to the thermoelectric semiconductor 630. The same reference characters in FIG. 9 refer to the same or like components as in FIGS. 1 and 7, and any repetitive detailed description thereof has hereinafter been omitted.

Referring to FIG. 9, when a reverse bias, e.g., an opposite bias as shown in FIG. 7, is applied to the thermoelectric semiconductor 630, a temperature at the first side of the thermoelectric semiconductor 630 facing the heat-circulating part 500 is increased, whereas a temperature at the second side facing the first side of the thermoelectric semiconductor 630 is decreased. Thus, the thermoelectric semiconductor 630 quickly supplies heat to the heat-circulating part 500.

Therefore, when the temperature control part 600 according to an exemplary embodiment of the present invention includes the thermoelectric semiconductor 630, the temperature control part 600 applies the forward bias to the thermoelectric semiconductor 630 to absorb heat from the heat-circulating part 500, and applies the reverse bias to the thermoelectric semiconductor 630 to supply heat to the heat-circulating part 500.

Hereinafter, a method for detecting X-rays according to an exemplary embodiment of the present invention will be described in further detail with reference to FIGS. 1 through 9.

During a non-applying period when X-rays are not applied to the X-ray detecting part 200 of the X-ray detector 5, ambient temperatures of the light-detecting diodes LD are detected using the light-detecting diodes LD of the X-ray detecting part 200. More specifically, leakage currents flow in the light-detecting diodes LD based on thermal energies thereof. Thus, the ambient temperatures of the light-detecting diodes LD are detected based on the detected leakage currents.

The detected ambient temperatures of the light-detecting diodes LD are compared to a reference temperature which has been previously determined. When the detected ambient temperatures are less than the reference temperature, heat is supplied to the heat-circulating part 500. On the other hand, when the detected ambient temperatures are greater than the reference temperature, heat is absorbed from the heat-circulating part 500. Thus, the ambient temperatures of the light-detecting diodes LD are changed based on the reference temperature. In an exemplary embodiment, a value of the reference temperature is in a range from approximately 20° C. to approximately 40° C.

The heat-circulating part 500 disposed under the X-ray detecting part 200 circulates heat to the entire surface of the heat-circulating part 500, such that a uniformity of the ambient temperatures of the light-detecting diodes LD is effectively improved, at a higher or lower ambient temperature, based on the reference temperature.

When the uniformity of the ambient temperatures of the light-detecting diodes LD is increased based on the reference temperature, X-rays applied to the X-ray detecting part 200 are detected by the X-ray detecting part 200. Thus, the X-ray detector 5 detects an intensity of the X-rays more accurately.

An X-ray detector according to the prior art detects a distorted intensity of X-rays based on to a position of the X-ray detector during initial operation of the X-ray detector.

Figure 10:
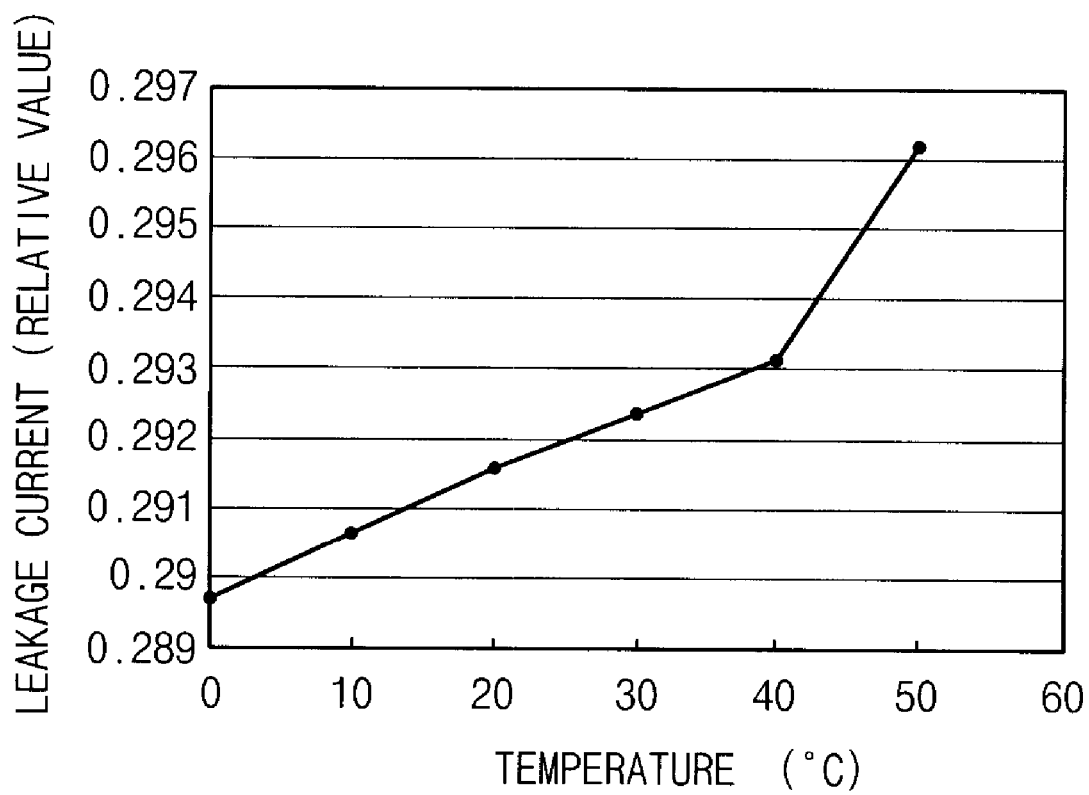
FIG. 10 is a graph of temperature versus leakage current of an X-ray detector according to an exemplary embodiment of the present invention.

FIG. 10 is a graph of temperature versus leakage current of an X-ray detector 5 according to an exemplary embodiment of the present invention. A relative value of leakage current is shown on the Y-axis of the graph of FIG. 10, based on a maximum value of leakage current of a light-detecting diode LD.

Referring to FIG. 10, the leakage current of the light-detecting diode LD increases as ambient temperature of the light-detecting diode LD increases. As a result, an overall current of the light-detecting diode LD includes the leakage current due to thermal energy, as well as a current due to light applied from outside the X-ray detector 5.

As illustrated in FIG. 10, when an ambient temperature of the light-detecting diode LD is different based on a position of the X-ray detector 5, the light-detecting diode LD detects a distorted intensity of received X-ray. Further, since the ambient temperature of the light-detecting diode LD is different based on a position of the X-ray detector 5 during an initial operation of the X-ray detector 5, the X-ray detector according to the prior art detected the distorted intensity of X-rays during the initial operation.

Therefore, in an exemplary embodiment of the present invention, a uniformity of ambient temperatures of the light-detecting diodes LD is effectively increased, thereby preventing distortion of the intensity of the detected X-rays.

More specifically, the X-ray detector 5 according to an exemplary embodiment of the present invention includes the heat-circulating part 500 substantially adjacent to the lower surface of the X-ray detecting part 200 to increase uniformity of the ambient temperatures of the light-detecting diodes LD.

Still referring to FIG. 10, when a temperature is increased to be greater than approximately 40° C., the leakage current of the light-detecting diode LD increases more rapidly relative to when the temperature is less than approximately 40° C. Thus, when the ambient temperature of the light-detecting diode is greater than approximately 40° C., distortion of the intensity of the detected X-rays is sharply increased.

Therefore, when the uniformity of the ambient temperatures of the light-detecting diodes LD is increased, the ambient temperatures according to an exemplary embodiment are less than approximately 40° C. Thus, the X-ray detector 5 according to an exemplary embodiment further includes the temperature control part 600 adjacent to the lower surface of the heat-circulating part 500, to thereby increase the uniformity of the ambient temperatures such that the ambient temperatures are less than the reference temperature, which in an exemplary embodiment is approximately 40° C.

FIGS. 11 and 12 are top plan views illustrating variations among ambient temperatures of light-detecting diodes of an X-ray detector 5 according to an exemplary embodiment of the present invention. More specifically, FIGS. 11 and 12 are top plan views illustrating a process of increasing a uniformity of ambient temperatures of the light-detecting diodes LD according to an exemplary embodiment.

Referring to FIG. 11, initial ambient temperatures of respective light-detecting diodes LD may be, for example, 30° C., 35° C. and 34° C., based on a position of the X-ray detector 5. When heat is distributed to the entire surface of the X-ray detector 5 by the heat-circulating part, the ambient temperatures become uniform, e.g., become substantially the same at approximately 35° C. Thus, during an initial operation of the X-ray detector 5 according to an exemplary embodiment, e.g., when one or more of the initial ambient temperatures is low compared to other initial ambient temperatures, the heat-circulating part 500 effectively increases the one or more low initial ambient temperatures, thereby effectively minimizing a need for a warm-up period of the X-ray detector 5.

Alternatively, referring to FIG. 12, initial ambient temperatures of respective light-detecting diodes LD may be, for example, 45° C., 42° C. and 43° C. based on a position of the X-ray detector 5. Although heat is distributed to the entire surface of the X-ray detector 5 by the heat-circulating part 500, the ambient temperatures uniformly higher and greater than approximately 40° C., since each initial respective ambient temperature was greater than 40° C. In this case, the temperature control part 600, disposed substantially adjacent to the heat-circulating part 500, absorbs heat from the heat-circulating part 500 such that the respective ambient temperatures become uniform, e.g., substantially the same at approximately 35° C., as shown in FIG. 11.

Thus, according to exemplary embodiments of the present invention as described herein, an X-ray detector is capable of accurately detecting an intensity of X-rays during initial operation of the X-ray detector. e.g., without needing to be preheated.

The present invention should not be construed as being limited to the exemplary embodiments set forth herein.

Rather, these exemplary embodiments are provided so that this disclosure will be thorough and complete and will fully convey the concept of the present invention to those skilled in the art.

Although the present invention has been particularly shown and described with reference to exemplary embodiments thereof, it will be understood by those of ordinary skill in the art that various changes in form and details may be made therein without departing from the spirit or scope of the present invention as defined by the following claims.

What is claimed is:

1. A method for detecting X-rays comprising:
   increasing a uniformity of ambient temperatures of light-detecting diodes in an X-ray detector by adjusting a temperature of a heat transfer material in heat-circulating paths disposed along substantially an entire surface of a heat-circulating plate; and
   detecting X-rays irradiated into the X-ray detector,
   wherein the heat-circulating paths are formed through the heat-circulating plate to be disposed in the heat-circulating plate.

2. The method for detecting X-rays of claim 1, further comprising:
   detecting the ambient temperatures of the light-detecting diodes based on a leakage current of the light-detecting diodes.

3. The method for detecting X-rays of claim 2, wherein the increasing the uniformity of the ambient temperatures of the light-detecting diodes comprises:
   comparing the ambient temperatures of the light-detecting diodes with a reference temperature; and
   one of increasing the ambient temperatures of the light-detecting diodes to the reference temperature and decreasing the ambient temperatures of the light-detecting diodes to the reference temperature.

4. The method for detecting X-rays of claim 3, wherein the reference temperature has a range from approximately 20° C. to approximately 40° C.

5. An X-ray detector comprising:
   an X-ray detecting part comprising a plurality of light-detecting diodes; and
   a heat-circulating part disposed adjacent to the X-ray detecting part, the heat-circulating part comprising:
   a heat-circulating plate;
   a plurality of heat-circulating paths disposed covering substantially the entire surface of the heat-circulating plate, the heat-circulating paths formed through the heat-circulating plate to be disposed in the heat-circulating plate;
   wherein the heat-circulating part circulates heat to increase a uniformity of ambient temperatures of the light-detecting diodes.

6. The X-ray detector of claim 5, wherein the heat-circulating pipe circulates heat to surfaces of the X-ray detector.

7. The X-ray detector of claim 6, wherein the heat-circulating plate comprises a metallic material having a high thermal conductivity.

8. The X-ray detector of claim 7, wherein the heat-circulating plate comprises aluminum (Al).

9. The X-ray detector of claim 6, further comprising a heat transfer material disposed in the plurality of heat-circulating paths.

10. The X-ray detector of claim 9, wherein a phase of the heat transfer material comprises at least one of a liquid phase and a gas phase.

11. The X-ray detector of claim 5, further comprising:
    a temperature control part disposed adjacent to the heat-circulating part, wherein the temperature control part exchanges heat with the heat-circulating part to increase the uniformity of the ambient temperatures of the light-detecting diodes.

12. The X-ray detector of claim 11, wherein the temperature control part comprises:
    a heat-generating part which generates heat, is disposed adjacent to the heat-circulating part, and transfers the heat to the heat-circulating part to increase the ambient temperatures of the light-detecting diodes; and
    a heat-absorbing part disposed adjacent to the heat-circulating part and which absorbs heat from the heat-circulating part to decrease the ambient temperatures of the light-detecting diodes.

13. The X-ray detector of claim 11, wherein the temperature control part comprises an air fan disposed under the heat-circulating part,
    wherein the air fan transfers heat from the heat-circulating part to outside the X-ray detecting part.

14. The X-ray detector of claim 13, wherein the temperature control part further comprises a heat transfer member comprising a first surface and being disposed between the air fan and the heat-circulating part,
    wherein the first surface of the heat transfer member is disposed on the heat-circulating part to transfer the heat from the heat-circulating part to the outside the X-ray detecting part via the air fan.

15. The X-ray detector of claim 14, wherein the heat transfer member further comprises a second surface opposite the first surface and including a concavo-convex part formed thereon, wherein the concavo-convex part increases a surface area of the heat transfer member.

16. The X-ray detector of claim 11, wherein the temperature control part comprises a thermoelectric semiconductor disposed adjacent to a bottom surface of the heat-circulating part,
    wherein a function of the thermoelectric semiconductor includes at least one of absorption of heat from the heat-circulating part and supply of heat to the heat-circulating part.

17. The X-ray detector of claim 16, wherein the temperature control part further comprises an air fan disposed adjacent to the thermoelectric semiconductor and which supplies the thermoelectric semiconductor with air.

18. The X-ray detector of claim 11, further comprising a temperature control circuit part electrically connected to the temperature control part to control the temperature control part.

19. The X-ray detector of claim 18, wherein the temperature control circuit part is electrically connected to the X-ray detecting part to receive a temperature detecting signal which corresponds to the ambient temperatures of the light-detecting diodes, and which controls heat exchange between the temperature control part and the heat-circulating part based on the temperature detecting signal.

20. The X-ray detector of claim 5, wherein the X-ray detecting part comprises:
    a detection panel comprising the plurality of light-detecting diodes, thin-film transistors electrically connected to the plurality of light-detecting diodes and signal lines electrically connected to the thin-film transistors;
    a driving printed circuit board disposed adjacent to a bottom surface of the heat-circulating part; and
    a flexible printed circuit board which electrically connects the detection panel to the driving printed circuit board.

* * * * *